United States Patent [19]

Zacharin

[11] Patent Number: 4,565,341
[45] Date of Patent: Jan. 21, 1986

[54] INFLATABLE DECELERATOR

[76] Inventor: Alexey T. Zacharin, 14 Cherry La., Parsippany, N.J. 07054

[21] Appl. No.: 559,531

[22] Filed: Dec. 8, 1983

Related U.S. Application Data

[63] Continuation of Ser. No. 305,010, Sep. 24, 1981, abandoned.

[51] Int. Cl.⁴ .............................................. B64D 17/80
[52] U.S. Cl. ................................. 244/113; 244/138 R; 102/386
[58] Field of Search ..................... 244/3.24, 3.25, 3.27, 244/3.29, 3.30, 110 R, 110 D, 113, 138 R, 138 A, 139, 140, 141, 160, 145, 146; 102/306–310, 337–340, 348, 354, 386–388, 394, 475, 476, 489

[56] References Cited

U.S. PATENT DOCUMENTS 2,819,856 1/1958 Hight .............................. 244/138 R
4,005,655 2/1977 Kleinschmidt et al. ........ 244/138 R Primary Examiner—Galen L. Barefoot
Assistant Examiner—Rodney Corl
Attorney, Agent, or Firm—Kane, Dalsimer, Kane, Sullivan and Kurucz

[57] ABSTRACT

The present invention relates to a collapsable decelerator for aerial bombs launched from a high velocity vehicle and designed to provide a high drag stabilizer capable of withstanding release in air stream velocities moving at 2600 feet per second. The deceleration includes a hollow inflatable star, the outermost points of which have hooded valve openings through which regulated airflow enters and inflates the star to decelerate the munition to which it is attached.

12 Claims, 8 Drawing Figures

LETHAL AREA AS A FUNCTION OF ANGLE OF WOBBLE

INFLATABLE DECELERATOR

GOVERNMENTAL INTEREST

The invention described herein may be manufactured, used, and licensed by or for the United States Government for governmental purposes without payment to me of any royalty thereon.

This application is a continuation of application Ser. No. 305,010, filed Sept. 24, 1981, now abandoned.

BACKGROUND OF THE INVENTION

When a retarding mechanism and a body suspended therefrom are launched from an aircraft or missile at high speed, deployment of a decelerator may cause a severe shock due to sudden retardation. Such shocks are often sufficient to cause structural failure of the retarding device or damage of the payload to which it is attached. Prior art retarding devices utilize parachutes, metal fin stabilizers and ballute technology to decelerate bomblets in progressive steps and to reduce the incidence of damage. A common difficulty with such devices has been that excessive speed at the time of dispersal often overstresses the decelerator and fails it. For example, parachutes provide drag at speeds below 1500 feet per second but upon opening suddenly at high speed the lines tangle, become disoriented or break. Parachutes are also unfit for use in wooded areas since they get hung up in branches and shrubs, thus preventing the load from impacting the target.

Metal fin stabilizers provide acceptable deceleration where release velocities are under 1600 feet per second but often structurally fail at higher speeds, and cause tumbling, unstable trajectories and insufficient dispersion patterns where wide scattering is desired.

The combination of a parachute and balloon referred to as ballute technology such as taught in U.S. Pat. No. 4215836 issued to the same inventor herein provides many advantages over the prior art. The invention in this case provides further and significant improvements over the concept covered by the noted patent.

SUMMARY OF THE INVENTION

The present invention relates to ballute technology which will permit successful dispersion at speeds about 2600 feet per second by providing air scoops which will assure proper inflation of the device and structural integrity. Following deceleration, the retarding device continues to function as a guidance and stabilizing device for a munition.

It is, therefore, an object of this invention to provide a novel high drag stabilizer attached to a munition so that improved reliabiltiy of operation is provided.

Another object of this invention is to provide a high drag stabilizer which can be economically constructed and can operate at speeds as much as 2600 feet per second.

Still another object of this invention is to provide a high drag stabilizer which is attached to a munition and, upon deceleration to a pre-selected terminal velocity, becomes a stabilizing device.

These and other objects and many of the attendant advantages of the present invention will become apparent as the same becomes better understood from the following detail description, taken in conjunction with accompanying drawings.

DETAILED DESCRIPTION OF THE INVENTION

Figure 1:
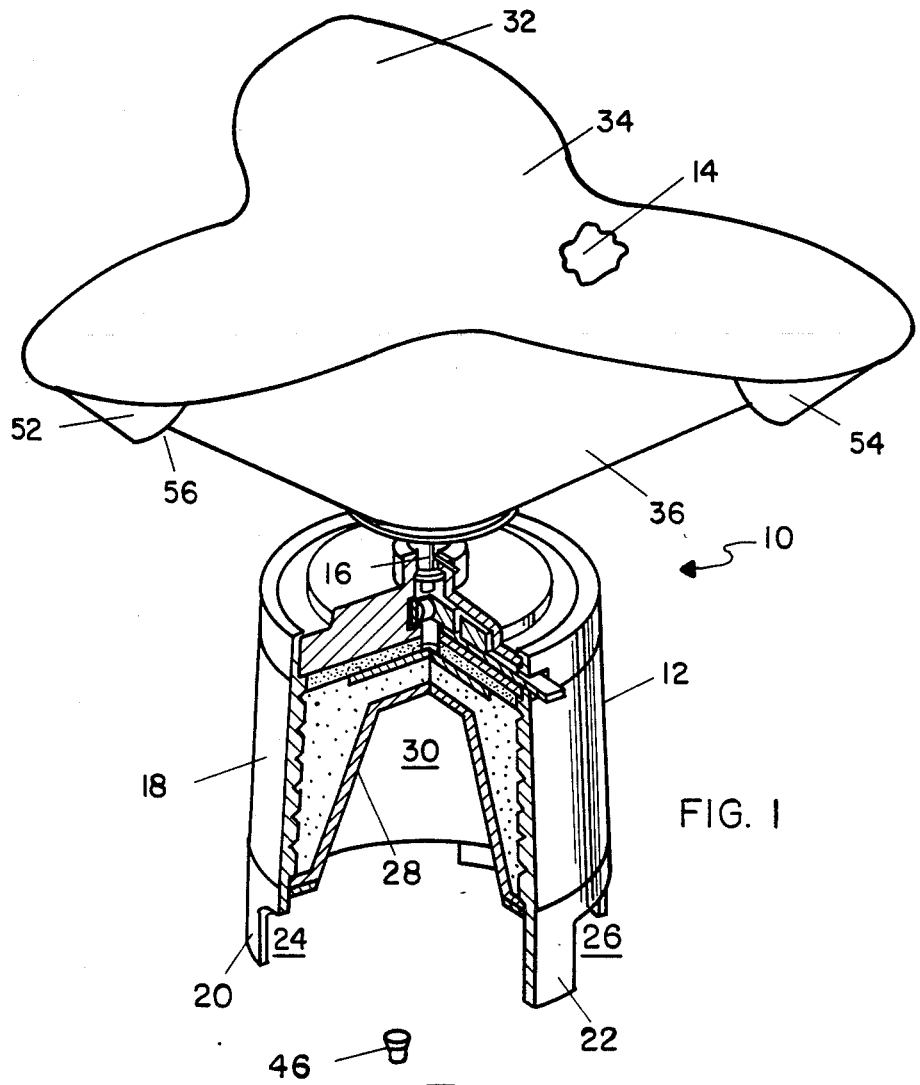
FIG. 1 is a general perspective view, partly broken away, of the inventive structure in this case.

Referring to the drawings, reference numeral 10 in FIG. 1 generally denotes a submunition assembly or combination in which a bomblet, submunition or other body 12 is securely attached to a decelerator comprising inflatable hollow flexible chamber 14 by means of a connecting rod or shaft 16 which functions in any convenient manner such as suggested for nut 28 and load stem 30 disclosed in mentioned U.S. Pat. No. 4,215,836.

Figure 4:
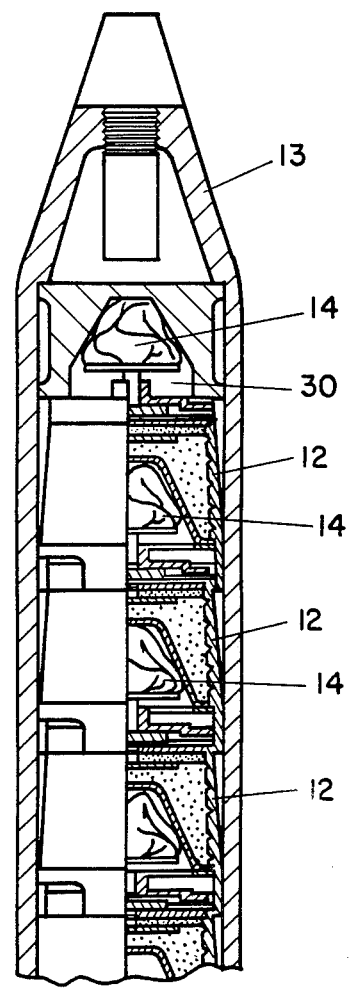
FIG. 4 is a view similar to FIG. 3 but showing multiple bomblets in nested relationship within a rocket.

Submunition or bomblet 12 includes an outer substantially cylindrical housing 18 with chamber 14 secured at one end thereof and terminating in a lower edge 19 having a series of rectangular projections 20, 22 in spaced-apart sequence as suggested by spaces 24 and 26. Housing 18 of bomblet 12 contains all the essential components (not shown) necessary for combat weapons of this type including an explosive mass, an impact detonator and other sensor mechanisms adapted to arm and actuate the explosive. In addition, housing 18 includes inner wall 28 forming a somewhat conical-shaped and concentric inner cavity or hollow storage space 30 volumetrically configured to accommodate the size and shape of chamber 14 when the chamber is in the collapsed or uninflated state. This permits the sequential packing of multiple bomblet assemblies about a longitudinal axis such as to occupy an elongate cylindrical rocket payload section in the manner suggested by FIG. 4.

Figure 2:
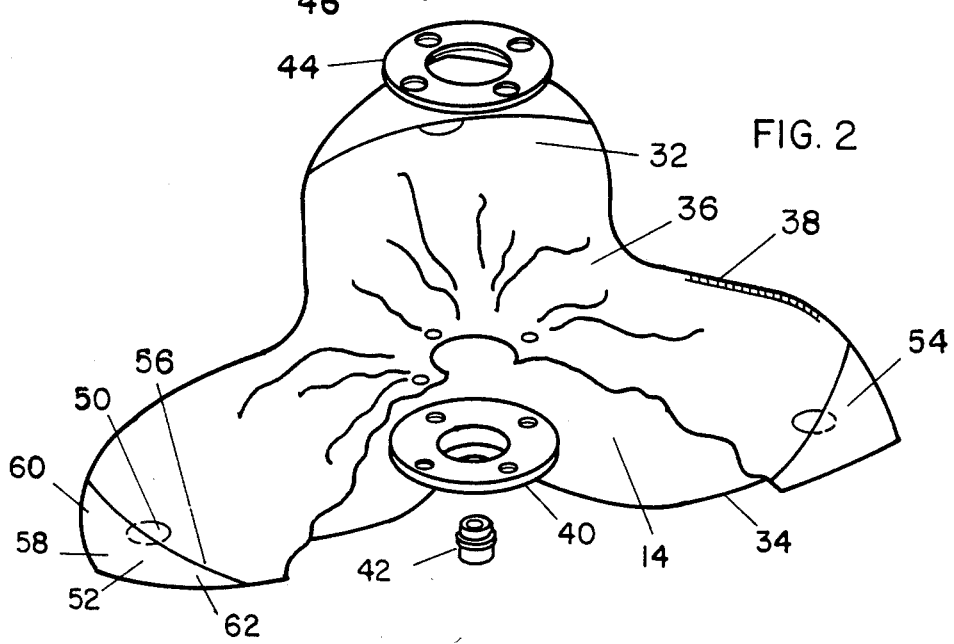
FIG. 2 is an isolated view of the decelerator device from FIG. 1, partly fragmented.

With reference to FIG. 2, the decelerator 14 may be seen to have a shape generally analogous to an essentially flat star illustratively having three radially outward projecting lobes or wings 32. The essentially star-shape chamber 14 is constructed by joining a flat top panel 34 to a slightly rounded bottom pannel 36 about their respective peripheries such as by continuous stitching in the manner suggested by seam 38 coextensive with the outer distal edges of both panels. Panel 36 contains sufficient material so as to form a slightly conical shape when chamber 14 is fully inflated such as suggested by FIG. 1 wherein upper panel 34 is substantially flat or planar while panel 36 provides deeper thickness at the center of chamber 14 than at the outer extremeties of the lobes 32. Each of the lobes 32 is an elongate inflatable compartment contiguous with the axial center portion of chamber 14. The cutout areas between lobes 32 are of significance in the performance of the decelerator as discussed below.

Attachment of the chamber 14 to bomblet 12 is done by the use of plate 40 having a swedged miniature clinch-nut 42 cemented to the inside of lower panel 36, while spacer ring 44 is cemented to the outside of panel 36. The plate 40 and the spacer ring 44 are also secured to each other by a plurality of rivets such as 4 equidistantly spaced rivets of the type suggested by rivet 46.

Of critical importance to the invention concept in this case is the addition of at least one hole proximate the outer distal edge of each lobe 32 as shown illustratively by hole 50 in FIG. 2. It is through the three holes thus formed that airflow necessary for inflation of chamber 14 occurs. Since the launch speed of the assembly 10 is based upon the operating characteristics of the bomb or missile from which it is launched, the airflow rate into chamber 14 can be adjusted according to the size of holes 50 in the lobes.

Of particular and critical importance, along with the starlike shape of chamber 14, is the use of scuppers or hoods over each hole 50 such as scuppers 52 and 54 seen in FIGS. 1 and 2. Each of the three hoods or pockets forms an upstanding covering over each of the holes 50 respectively, but spaced-apart therefrom to engage or capture a small portion of the external airflow around chamber 14 and scoop such portion into the pocket such that it will be confined and spilled or otherwise directed into the hole 50 covered by the pocket. Thus, each pocket as suggested by pocket 52 in FIG. 2 has an open end portion 56, a blind closure end portion 58, and side portions 60 and 52 extending therebetween. These portions comprises surfaces which slope from the open ended air inlet area 56 toward blind terminus 58 from which there is no outlet or escape, whereby airflow entering the inlet 56 is forced through hole 50 and thence into chamber 14.

Figure 3:
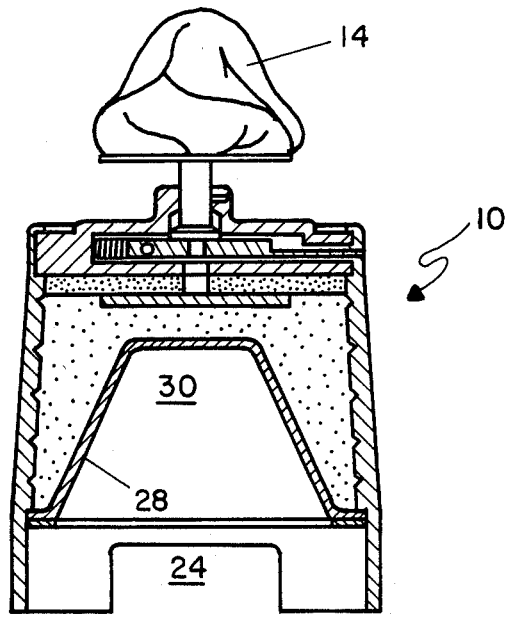
FIG. 3 is a cross-sectional elevational view of the structure seen in FIG. 1 but with the decelerator in a collapsed or folded state.

The scooping action thus achieved by pockets 52 and 54, for example, is especially significant in assuring reliable and effective operation of the decelerator in this case. As seen from FIGS. 3 and 4, the submunition assembly 10 prior to its deployment in combat use is stored or stacked with decelerator 14 tightly folded and collapsed upon itself to form a high density mass within the smallest possible space envelope. This permits the highly compressed and compact mass of chamber 14 to fit in tightly and close intimate nested relationship within concentrically formed cavity 30 at the center of each bomblet 12. However, when the submunitions 10 are ejected into space while moving at high speed such as 2600 feet per second or more, positive and forceful action is essential to assure that the compact mass of collapsed chamber 14 will not remain stuck together in a relatively solid ball, but will inflate and become distended so that its decelerating and stabilizing functions on bomblet 12 will occur.

The mentioned forceful and positive action to unfold and inflate chamber 14 is achieved by the scuppers including items 52 and 54 described above. Thus, the chamber 14 when collapsed is folded in a manner so that one or more of the scuppers or pockets such as items 52 and 54 are exposed on an exterior surface of the folded mass. Upon deployment into a relatively high speed mass of air, the hoods or pockets will initially engage and capture a portion of the air surrounding the mass, and direct this portion into the chamber 14, which will then begin to unfold and extend all of its lobes 32 radially outward, in the same manner of a pilot chute dragging the main canopy into an airstream during operation of a parachute.

The starlike form of chamber 14 provides very important advantages not available from other chamber shapes such as square or round. Thus, the lobes 32, being arranged about a center longitudinal axis, displace an impacting mass of air in a similarly arranged pattern between the lobes whereby balanced aerodynamic forces about the noted axis invariably result. This causes self-correction of the position and direction of movement of bomblet 12 to lessen or minimize wobbling, tumbling or non-uniformity in its flight path such as would produce excessive scatter in a rocket payload comprising multiple bomblets, misfires or duds due to angular misalignment of the firing mechanism with respect to an impact surface at the target. While more than three lobes might achieve a satisfactory result if arranged in the manner discussed above, not less than three are necessary to provide the required balance and three only are preferred.

While star-shaped chamber 14 provides significant improvements over conventional decelerators regardless of the shape or configuration of bomblet 12, it has been found particularly advantageous to provide bomblet 12 with a lower distal edge of non-uniform planarity as illustrated by castellated or scalloped edge 19. Thus, referring to FIG. 5, arrow 64 denotes the path of movement of bomblet 12 during its descent following deployment from a missile or artillery projectile. Arrows 66 denote the direction of the free air stream relative to bomblet 12. Dashed lines 68 and 70 suggest the area of separation between air flow masses having different characteristics due to aerodynamic interference from bomblet 12. Thus, sustained impact of airflow 66 against the lower end 19 of bomblet 12 will result in highly turbulent flow proximate surface 18 starting at uniform flow occurs in the free air stream outside the masses of air characterized by these flow conditions is suggested by lines 68 and 70.

Each of the lines 68 and 70 may be seen to approach surface 18 at vertically spaced-apart locations, since the turbulent effect begins where free air stream 66 initially makes contact with edge 19. Thus, line 70 extends generally upward from the lowermost edge of downward projecting rectangle 22, forming an inclosed angle 72 with surface 18. Line 68 extends at an angle 74 from the same surface, but at a higher location thereon, notably the top of space 24. While the angles 72 and 74 are identical, their lateral distance, respectively, from vertical centerline 76 axially through bomblet 12 differs. Distance 78 may be seen to be noticably longer than distance 80. The star shape of chamber 14 is designed to take advantage of this flow phenomena, since the outermost ends of each lobe on the star are dimensioned so as to project beyond the turbulent flow space in the manner illustrated by lobe 32 in FIG. 5 when chamber 14 is fully inflated. Lobe 32 extends a radial distance from axis 76 in excess of distance 80, whereby pocket 54 is situated in the free stream area outside of the turbulent area between lines 68 and 70.

Figure 5:
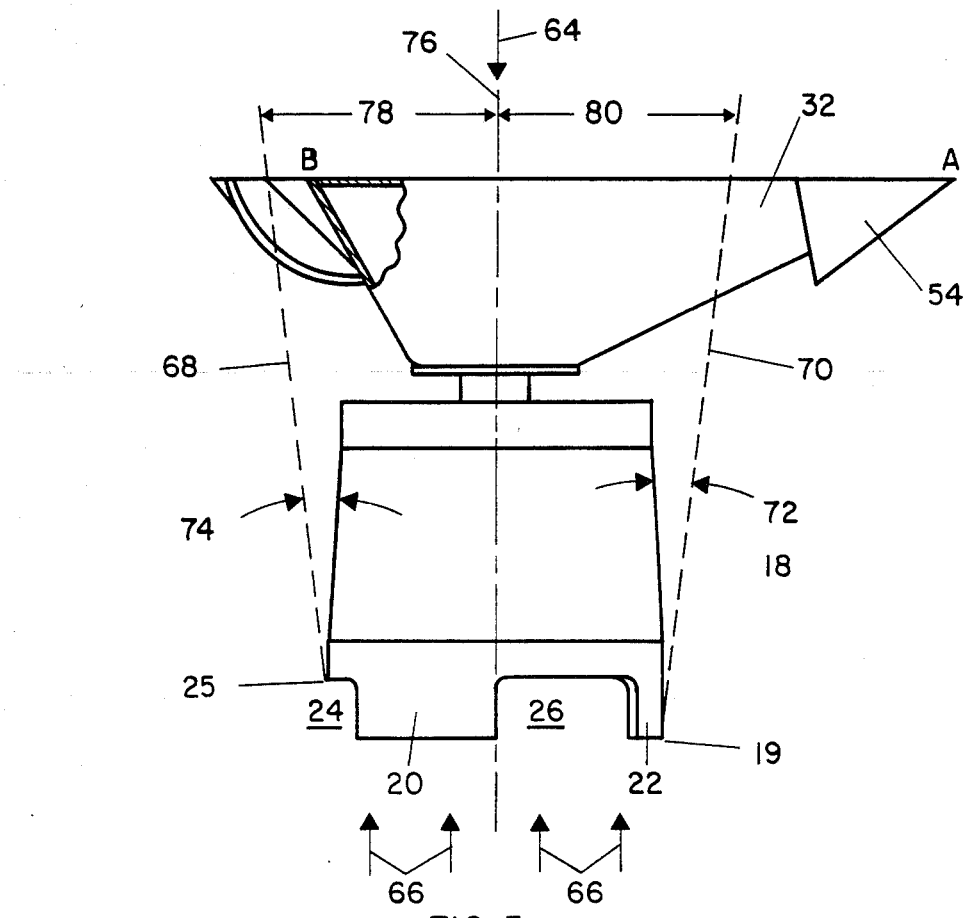
FIG. 5 is a side elevation of the structure seen in FIG. 1.
Figure 6:
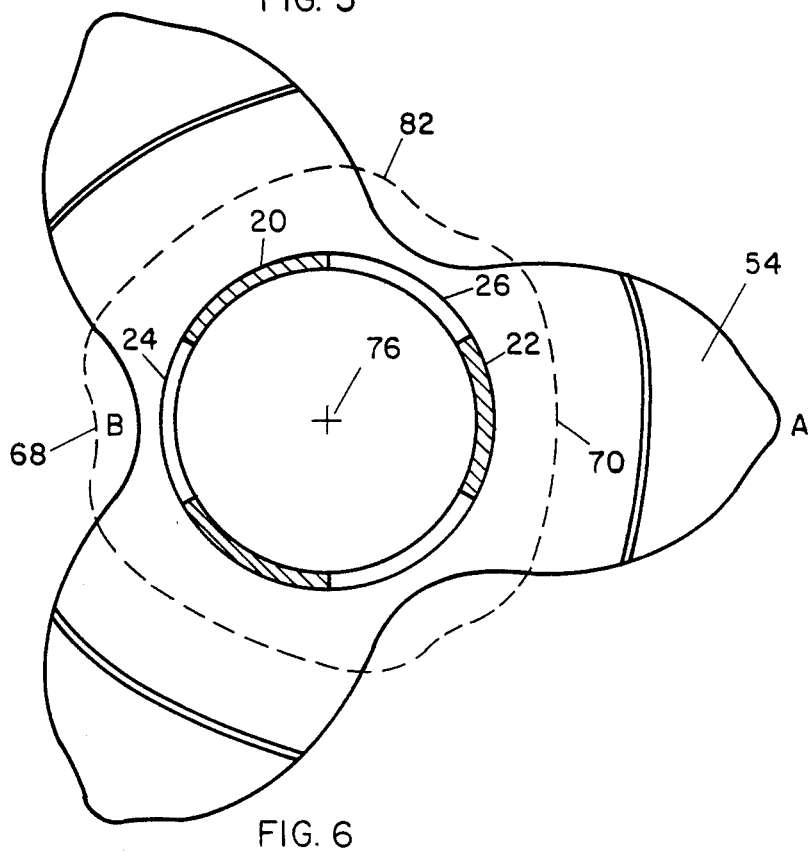
FIG. 6 is an isolated view of structure from FIG. 5.

The flow pattern thus suggested in FIG. 5 is shown in FIG. 6 which is a view seen from below FIG. 5 looking in the direction of arrows 66. The dotted line as seen in FIG. 6 shows that the shape of the flow pattern resulting from castellated contours 20, 28, 24 and 26, for example, follows essentially the same contour or pattern as lobes 32. Thus, line 68 corresponds with the portion of line 82 which is radially closest to center axis 76. This pattern results from the castellated contour of the lower distal edge of bomblet 12 and, in combination with the star pattern of chamber 14, produces a stabilizing action which avoid spinning of the submunition 10. If pockets 54 were inside the turbulent space envelope or frustoconical volume defined by lines 68 and 70, chamber 14 would not inflate, but merely would flap about ineffectively.

Figure 8:
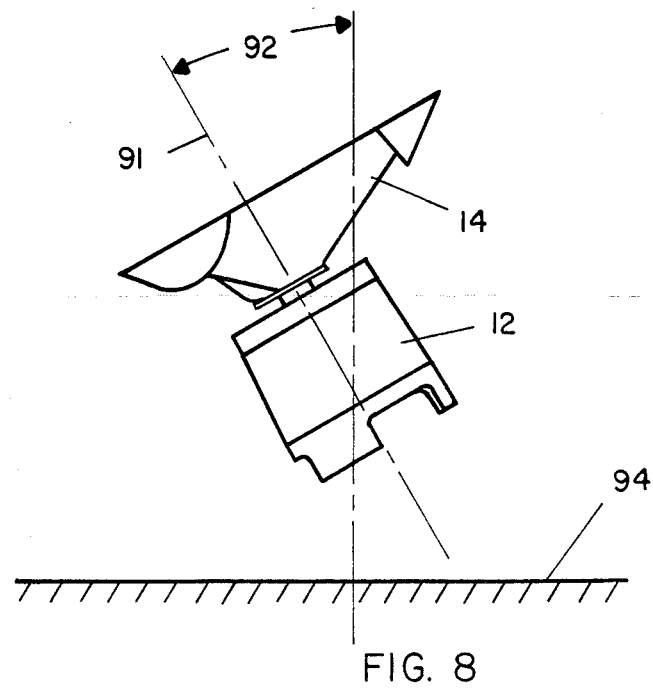
FIG. 8 is a general view of the FIGS. 1 through 5 structure just prior to impact with a target.
Figure 7:
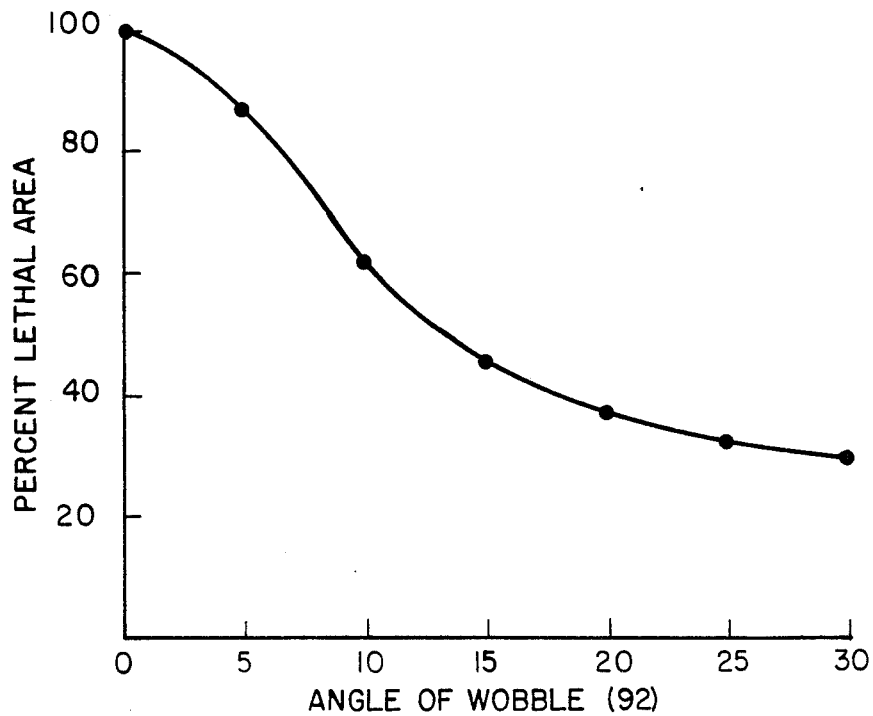
FIG. 7 is a graph depicting loss of combat effectiveness in the structure of FIGS. 1 through 5 based on angular displacement.

FIG. 7 shows a graph of the effects of poor impact angle on the lethality of bomblet 12, while FIG. 8 shows the angular parameter to which the graph of FIG. 7 refers.

In FIG. 8, reference numeral 94 denotes a target surface which in some cases could be the ground and in other cases might be an armored surface of a tank. Bomblet 12 could contain a shaped charge for penetrating armor plate, an exploding fragmentation device for anti-personnel or other payload type such as signal sensing or relay device typically having several antennas in a symmetri array. In a fragmentation bomblet for anti-personnel use, the widest dispersion of fragments for maximum effectiveness occurs when bomblet 12 is substantially vertical at the moment it detonates, so that the blast effects are horizontal. If the bomblet detonates while tipped at an angle, much of the blast effect an fragmentation will disperse upwardly at an angle toward the sky, hence will inflict no damage or injury to personnel on the ground. Thus, when the vertical axis through bomblet 12 is at a 15 degree angle from a vertical reference, the lethality of its burst will be only 60 percent of the maximum achievable with the axis vertical. Similarly, for proper placement of antennas on the body 12, it must land with its center axis vertical. While no antennas are shown in the drawings, it will be understood that any suitable antenna system among the many known to the prior art may be adapted for use in body 12. Similarly, no shaped charges are shown, and the invention in this case does not depend upon selection of any particular such penetration system known to the prior art. However, with any such system, it is critically important that body 12 containing a shaped-charge must have its center axis very nearly vertical when actuated to penetrate a substantially horizontal armor plate surface, since the amorphous metal train formed by the shaped charge will otherwise not effectively penetrate and defeat such plate. It is also important, especially in the case of fragmentation mechanisms, that body 12 not be spinning at the time of impact. The de-spin function of chamber 14 is highly effective because lobes 32 have aerodynamic properties analagous to fins, whereby free airflow between the spaced-apart lobes retards their rotation about center axis 76 in FIG. 6.

While only one illustrative example of device according to the present invention has been described herein, many variations thereof are possible within the scope of the teachings of this disclosure. Accordingly, the scope of the invention is not limited by the example described but rather by the language of the appended claims.

I claim:

1. A combination deceleration and de-spin device for attachment to a sub-munition, comprising:
    an inflatable starshape chamber having at least three radially extending lobes and having in its inflated state an essentially flat upper surface and a conical lower surface,
    air inlet means on each of said lobes proximate the outermost ends thereof, and
    air scoop means operatively related to each said air inlet means and including an upstanding hood around said inlet means and spaced-apart therefrom for capturing a portion of external airflow around said chamber and directing said portion into said inlet to inflate said chamber.

2. The invention in accordance with claim 1, wherein the inflatable starshape chamber is so constructed and arranged that prior to deployment into an air stream, the lobes are tightly folded and collapsed upon themselves to form a high density compressed compact mass within the smallest possible space envelope.

3. The invention in accordance with claim 2, wherein the highly compressed and compact mass is so constructed and arranged to fit tightly and in close intimate nested relationship with a concentrically formed cavity at the center of each sub-munition.

4. The invention in accordance with claim 3, wherein ejection of the decleration and despin device into an air stream causes the compressed and compact mass to be distended and the chamber inflated so as to decelerate and stablize the sub-munition.

5. The invention in accordance with claim 4, wherein the chamber is collapsed and folded in a manner so that one or more of the hoods are exposed on an exterior surface of the folded mass so that upon deployment into an air stream, the pockets will initially engage and capture a portion of the air surrounding the mass and direct this portion of air into the chamber which will begin to unfold and extend all of the lobes radially outwardly to inflate the chamber.

6. The invention in accordance with claim 1, wherein the lobes are so constructed and arranged about a center vertical axis whereby balanced aerodynamic forces about the axis results when air impacts against the lobes causing self-correction of the position and direction of movement of the sub-munition to lessen and minimize wobbling, tumbling or nonuniformity in its flight path.

7. An inflatable decelerator for deployment with an attached load unit in an airstream comprising:
    an inflatable flexibly collapsible chamber of generally starshape form consisting of a plurality of radially outwardly projecting lobes in spaced-apart relationship to each other, said chamber in its inflated state having an essentially flat upper surface and a conical lower surface.
    air inlet means including at least one air passage proximate the outer distal end of each said lobe, and
    air scoop means operatively related to each said air inlet and including an upstanding hood covering said inlet and spaced-apart therefrom for capturing a portion of external airflow around said chamber and directing said portion into said inlet to inflate said chamber.

8. The structure set forth in claim 7, further including:
    a payload body of elongate form,
    attachment means on one end of said body for securing said chamber to said body,
    said body having a lower end opposite from said one end,
    said lower end having a castellated shape with cut-out portions between spaced-apart projections, one of said projections being in vertical alignment under each of said lobes.

9. The structure set forth in claim 8 above, wherein:
    said lobes are three in number, and
    said projections are three, one under each of the lobes, and the outermost end of each said lobe projects outward beyond the turbulent flow resulting from contact of the free air stream with said lower end.

10. The structure set forth in claim 8 above, wherein: said payload body comprises a generally cylindrical shaped bomblet for fragmentation against ground targets.

11. The structure set forth in claim 8 above, wherein: said payload body comprises a signal sensing antenna array.

12. The structure set forth in claim 8 above, wherein: said payload body comprises a shaped charge for penetrating armor plate.

* * * * *

UNITED STATES PATENT AND TRADEMARK OFFICE
CERTIFICATE OF CORRECTION

PATENT NO. : 4,565,341
DATED : January 21, 1986
INVENTOR(S) : ALEXEY T. ZACHARIN It is certified that error appears in the above-identified patent and that said Letters Patent is hereby corrected as shown below:

Column 1, lines 1-9, delete

"GOVERNMENTAL INTEREST"

"The invention described herein may be manufactured, used, and licensed by or for the United States Government for governmental purposes without payment to me of any royalty thereon."

Signed and Sealed this

Twentieth Day of May 1986

[SEAL]

Attest:

DONALD J. QUIGG

Attesting Officer

Commissioner of Patents and Trademarks